(12) United States Patent
Isom et al.

(10) Patent No.: US 6,818,336 B2
(45) Date of Patent: Nov. 16, 2004

(54) FUEL CONTROL FOR FUEL-PROCESSOR STEAM GENERATION IN LOW TEMPERATURE FUEL CELL POWER PLANT

(75) Inventors: Joshua D. Isom, Ellington, CT (US); Ha-Anh H. Pho, Bristol, CT (US); Zakiul Kabir, Glastonbury, CT (US); Paul R. Margiott, South Windsor, CT (US); George Vartanian, Ellington, CT (US)

(73) Assignee: UTC Fuel Cells, LLC, South Windsor, CT (US)

(*) Notice: Subject to any disclaimer, the term of this patent is extended or adjusted under 35 U.S.C. 154(b) by 50 days.

(21) Appl. No.: 10/224,210

(22) Filed: Aug. 20, 2002

(65) Prior Publication Data

US 2004/0038091 A1 Feb. 26, 2004

(51) Int. Cl.[7] .................. H01M 8/04; H01M 8/12; H01M 8/00; H01M 8/18; H01M 2/14
(52) U.S. Cl. .................. 429/22; 429/13; 429/19; 429/23; 429/24; 429/25; 429/38
(58) Field of Search ............... 429/13; 649/19, 649/22, 23, 24, 25, 38

(56) References Cited

U.S. PATENT DOCUMENTS

| | | | |
|---|---|---|---|
| 4,002,805 A | * | 1/1977 | Waldman ............... 429/17 |
| 5,335,628 A | | 8/1994 | Dunbar ................. 122/1 R |
| 5,470,360 A | | 11/1995 | Sederquist ............. 48/94 |
| 6,120,923 A | | 9/2000 | Van Dine et al. ........ 429/17 |
| 6,299,994 B1 | | 10/2001 | Towler et al. .......... 429/17 |
| 6,393,354 B1 | * | 5/2002 | Scheffler et al. ....... 701/99 |

FOREIGN PATENT DOCUMENTS

WO     WO 00/39875     7/2000

* cited by examiner

Primary Examiner—Patrick Ryan
Assistant Examiner—Julian Mercado
(74) Attorney, Agent, or Firm—Stephen A. Schneeberger

(57) ABSTRACT

A control method and arrangement (48, 50, 150, I, T, P, FFL) are provided in a fuel cell power plant (10) for regulating (48, FC) fuel flow to a steam-based fuel processing system (FPS) (14) associated with a low-temperature fuel cell stack assembly (12). A portion of the fuel provided by the FPS (14) is used to provide steam for the FPS. The fuel flow to the FPS is regulated as a function of the power demand (I) on the fuel cell (12) and at least the enthalpy of the steam (P, T), such that the steam enthalpy is regulated to meet increases and decreases in power demand without exceeding steam pressure limits. In addition to reliance on-steam pressure (P) as a fundamental measure of steam enthalpy, the control may additionally use reaction temperature (T) at, or in, a reformer, such as a catalytic steam reformer (132), to regulate fuel flow and thus, steam enthalpy.

11 Claims, 3 Drawing Sheets

FUEL CONTROL FOR FUEL-PROCESSOR STEAM GENERATION IN LOW TEMPERATURE FUEL CELL POWER PLANT

TECHNICAL FIELD

This invention relates to fuel cell power plants, and more particularly to delivery and control of hydrogen-rich fuel to a fuel cell stack assembly. More particularly still, the invention relates to fuel control for fuel-processor steam generation in a low temperature fuel cell power plant.

BACKGROUND ART

Most fuel cell power plants rely on a supply of hydrogen-rich fuel to the anode of a fuel cell stack assembly (CSA) to provide a reducing agent for electrochemical reaction with an oxidant to provide electrical energy, and the by-products, water and heat. The oxidant, which may be air, is supplied to the cathode of the CSA. The anode and cathode are separated by an electrolyte that defines the type of CSA. One common electrolyte is, and has been, phosphoric acid. Phosphoric acid fuel cells tend to operate at relatively high temperatures, resulting in attendant advantages and disadvantages. Another more recent fuel cell is the PEM cell, which employs a polymer electrolyte membrane, or proton exchange membrane, (PEM) as the electrolyte. The PEM fuel cell operates at temperatures (and sometimes pressures) that are well below those of phosphoric acid cells, typically being at temperatures less than the boiling point of water, resulting in a number of advantages that contribute to the growing interest in and application of, this fuel cell. On the other hand, the reduced temperature of operation of a PEM fuel cell also creates some additional challenges.

As is the case for many fuel cell power plants, some source of raw hydrocarbon feedstock is processed within the power plant to provide the requisite hydrogen-rich flow of fuel reactant, or reducing agent, to the anode. That processing is done by a fuel processing system (FPS) that tends to segregate the hydrogen from the carbon and/or oxygen constituents of the hydrocarbon feedstock in any of several known processes. Common to most of those processes is the use of a reformer, with the additional inclusion of a shift converter and possibly a selective oxidizer also being common. The reformation of the hydrocarbon feedstock normally employs a reforming reaction exemplified by: $CH_4 + H_2O \rightarrow 3H_2 + CO$, and a subsequent shift conversion reaction exemplified by: $CO + H_2O \rightarrow H_2 + CO_2$. The reformation may be performed by various types of reformers, such as, for example, a catalytic steam reformer (CSR) or an autothermal reformer (ATR), as discussed in greater detail in U.S. Pat. No. 6,120,923. The reaction in an CSR is endothermic and requires the addition of heat, whereas the reaction in an ATR is exothermic and does not require the separate addition of heat. Although the type of reformer may vary as a function of the feedstock to be reformed, they have the common requirement that water ($H_2O$), heated to steam, is used in the reaction. Moreover, the reactions are facilitated by the enthalpy of the steam and, at least for the CSR, may require supplemental heat. For the reformer of each particular fuel supply system, there is a corresponding optimal steam-to-carbon ratio for the production of the $H_2$ needed by the fuel cell at various operating/load conditions.

As noted, phosphoric acid fuel cell systems operated at higher temperatures, and thus typically had sufficient heat reserves to provide the necessary steam for the reformation reaction under all conditions. On the other hand, for fuel cells operating at lower temperatures, such as PEM cells, it has been necessary to provide supplemental heat sources to raise water to steam for the reformation reaction. One technique, typified by the aforementioned U.S. Pat. No. 6,120,923, employs unused fuel reactant gas, exiting as exhaust effluent from the anode of the CSA, to fuel a burner and/or boiler to provide the requisite steam and heat. Typically, the flow of anode exhaust effluent fuel used for supplemental heat was adjusted as a function of the electrical loading of the system. Although this allowed the fuel flow to track load demand to some extent, it did not necessarily provide the steam enthalpy needed for efficient transient response, both increases (up) and decreases (down), under all anticipated conditions.

It is desirable to have the CSA closely follow the load, such that the power plant is always operating at, or near, the level required by the loads. Such load-following operation allows the power plant system to be more efficiently sized and operated, while assuring the requisite power for changing load demands. Not only is it desirable to have sufficient steam to process sufficient fuel for the CSA during load increases, but it is also desirable that the steam pressure not be excessive, for both economic and structural reasons, during load decreases. This, then, requires a balanced supply of steam. However, as discussed above, the present management of thermal energy in a low temperature fuel cell power plant is typically not sufficient to provide the responsiveness needed in the fuel reformation process to accommodate the changes in hydrogen fuel demands at the anode of the CSA needed to efficiently support load-following operation.

Accordingly, it is a principal object of the invention to provide an arrangement for managing thermal energy in a low temperature fuel cell power plant to provide the responsiveness needed in the fuel reformation process to accommodate changes in hydrogen fuel demands needed to support load-following operation.

It is a further object of the invention to provide an arrangement for assuring sufficient, and balanced, thermal energy for the fuel reformation process to efficiently respond to load-following operation of the fuel cell.

It is an even further object of the invention to provide an arrangement for regulating fuel flow to the anode of a fuel cell to assure a balanced flow of effluent therefrom for supporting a balanced supply of steam and possible other thermal needs of the fuel reformer to support on-demand operation of the fuel cell.

DISCLOSURE OF INVENTION

The present invention is a control arrangement, in a fuel cell power plant having a low temperature fuel cell stack assembly (CSA), a fuel processing system that requires steam, and means for providing steam for the fuel processing system, for regulating fuel flow to the fuel processing system to provide sufficient fuel to the fuel cell stack for on-demand operation and to raise sufficient steam for the fuel processing system. The fuel processing system, using process steam, converts a hydrocarbon feedstock to a hydrogen-rich fuel supply for the anode of the CSA. The hydrogen-containing exhaust effluent from the anode is used to provide thermal energy to raise the process steam for the fuel processing system. The flow of hydrocarbon feedstock is controlled to maintain the enthalpy of the supply of process steam so as to provide the hydrogen-rich fuel supply needed to rapidly respond to increases and decreases in electrical demand on the CSA without exceeding steam pressure limits.

Fuel cell load current is monitored to measure electrical demand and provide a basic control signal to regulate fuel flow to the steam processing system, and thus also to the anode of the CSA. A parameter of the steam, such as pressure or temperature, is monitored as a measure of the enthalpy of the steam supply available for the conversion of the hydrocarbon feed stock to the hydrogen-rich fuel supply required by the anode of the CSA, and provides a correction, or compensation, signal to the control signal derived from the load current signal, to assure a sufficient, balanced supply of steam under changing load demands on the CSA within steam pressure limits during up and down transients. Those steam pressure limits are typically determined by the structural limits of the system relative to high-pressure limits, and by minimum operating requirements relative to low-pressure limits, and may differ from system to system. The actual fuel flow is monitored and provides a feedback signal to the fuel flow control signal. Control of fuel flow may be via regulation of a flow valve, a blower, or the like. The control arrangement includes those elements necessary for the desired response, and may be implemented in various configurations capable of providing the requisite functions. Outer and inner control loops, each having one or more algorithms, typically using proportional/integral (PI) control, are preferably used.

The fuel processing system includes a reformer, which may typically be an autothermal reformer (ATR) or a catalytic steam reformer (CSR), depending in part on the hydrocarbon feedstock and other factors. In the event a CSR is used, a temperature indicative of the endothermic reaction conditions in the reformer, such as the temperature of the top tubes in the reformer, may additionally be monitored to provide a temperature signal that is used to further adjust the fuel flow control signal.

The foregoing features and advantages of the present invention will become more apparent in light of the following detailed description of exemplary embodiments thereof as illustrated in the accompanying drawings.

BEST MODE FOR CARRYING OUT THE INVENTION

Figure 1:
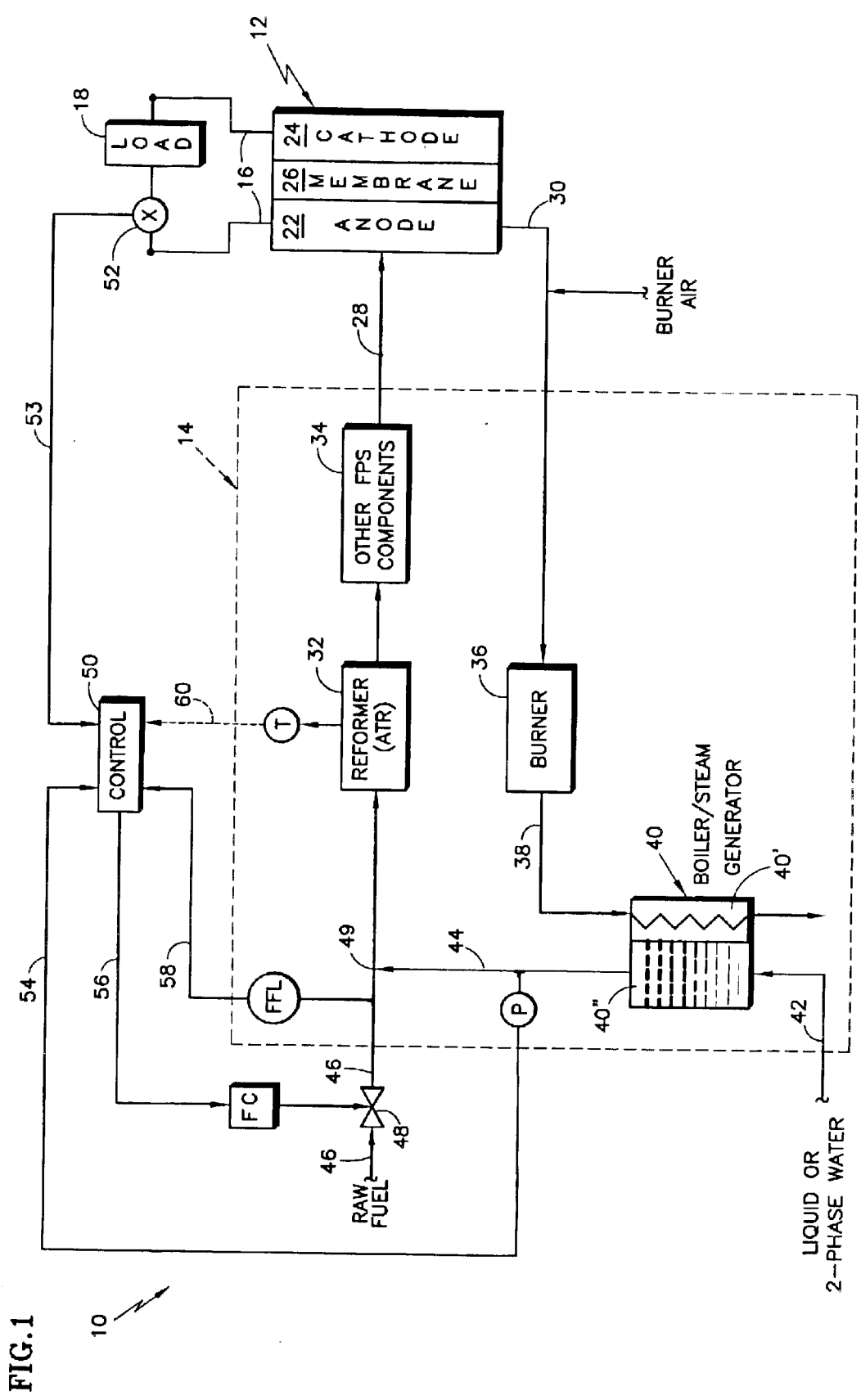
FIG. 1 is a schematic diagram of the relevant portions of a representative fuel cell power plant in which the control arrangement of the invention is used, and incorporating a fuel processor having an autothermal reformer (ATR)

Referring to FIG. 1, there is depicted a fuel cell power plant 10 having a fuel cell stack assembly (CSA) 12, a steam-dependent fuel processing system (FPS) 14 for converting a flow of hydrocarbon feedstock to a hydrogen-rich fuel supply for the CSA 12, electrical terminals 16 from the output of CSA 12 across which an electrical load 18 may be connected, and a control 50 for regulating the flow of hydrocarbon feedstock supply to the FPS 14 in a manner that provides an adequate hydrogen-rich fuel supply for the CSA 12 under on-demand operation, while optimizing the requirement for steam in the FPS 14.

The CSA 12 is a low-temperature fuel cell, typically of the PEM type, that operates below boiling, typically in the range of about 4.5° C. (40° F.) to 82° C. (180° F.). The CSA 12 includes an anode region 22, a cathode region 24, and an electrolyte region 26 that, in this instance, is a polymer electrolyte membrane (PEM). The CSA 12 operates in a well-known manner to electrochemically convert a fuel reactant and an oxidant reactant to water and electrical energy. It will be understood that the invention is also applicable to other low-temperature fuel cells, such as alkaline cells and the like, having other electrolyte media. Additionally, the CSA 12 and the plant 10 as a whole, typically include a well-known water management portion, most of which is not separately shown here. Such water management may include a cooler or water transport media associated with the CSA 12 to supply and remove water from the CSA, as well as separate water management plumbing for heat transfer and the production of steam.

The anode 22 of CSA 12 receives a supply of hydrogen-rich fuel from the FPS 14 via conduit 28 to serve as the reducing reactant in the electrochemical reaction. Part of that fuel is consumed in the reaction in the CSA 12, however an unused portion is discharged from the anode 22 as an exhaust effluent at conduit 30. That anode exhaust effluent contains a partially depleted supply of hydrogen, and is available to provide, through combustion, a source of heat to at least raise steam for the FPS 14, and additionally, in the instance of a CSR, to provide heat to the reformer. The anode exhaust effluent may additionally be recirculated to the anode 22.

Referring to the FPS 14 in greater detail, there is included a reformer, in this instance an autothermal reformer (ATR) 32, for converting a fuel feedstock to the hydrogen-rich supply for the CSA 12. The ATR 32 is of known design and operation, and exothermically converts the fuel feedstock, water (in the form of steam), and air to $H_2$ and CO. In order to further process the effluent from ATR 32 to further shift the CO to $CO_2$ and to enhance the yield of $H_2$, the FPS 14 typically also includes additional components 34, that may include a shift converter, a selective oxidizer and/or other components, not shown in detail. A burner 36 (sometimes referred to as a "reformer burner") is supplied, directly or indirectly via conduit 30, with the partially-depleted hydrogen effluent from anode 22, which hydrogen is combusted to serve as a source of heat to facilitate the reformation process. The heat from the exhaust of burner 36 is conveyed, via conduit 38 which may include heat exchangers, at least to the primary 40' of a boiler or steam generator 40. Water, either as liquid or as 2-phase including steam, enters the secondary 40" of boiler 40 via conduit 42 from the water management system, and is raised to steam therein. The steam produced in steam generator 40 exits therefrom via conduit 44 and is available for use with the fuel feedstock in the reformation reaction in reformer 32. The enthalpy of this steam, as indicated by its pressure and/or temperature, determines the ability of the steam to reform, at least in part, sufficient quantities of raw fuel feedstock to the desired quantities of hydrogen-rich fuel. In the instance of the use of a CSR, it may be desirable to additionally use the heat from the reformer burner to heat the reformer directly, as will be explained hereinafter.

It will be understood that the fuel cell power plant 10, and particularly the FPS 14, possesses steam pressure limits, both high and low, to assure safe and efficient operation of the system. The steam pressure limits are typically determined by the structural limits of the system relative to high-pressure limits, and by minimum operating requirements relative to low-pressure limits, and may differ from system to system.

The raw fuel feedstock is supplied to reformer 32 via conduit 46. The raw fuel feedstock may be any of a number of hydrocarbons typically used for this purpose, including gasoline, diesel fuel, natural gas, propane, light naptha, etc. Typically an ATR will be used to reform the heavier fuels, whereas the lighter fuels may also be reformed using a CSR. Moreover still, the term "hydrocarbons" as used herein should be viewed as including not only the heavier C—H-only hydrocarbons, but also the alcohols and other oxygen-containing hydrocarbons. The rate of flow of the raw fuel feedstock is governed, or controlled, by a variable flow controller 48 in the conduit 46, which flow controller may be a valve, a blower, or the like. Although the variable flow controller 48 is depicted as being upstream of the reformer 32 where the fuel is relatively cool, it will be appreciated that it might alternatively be placed at any of various locations downstream thereof, prior to the CSA 12. The steam in conduit 44 is added to or mixed with, the raw fuel feedstock just prior to introduction to the reformer 32, as at junction 49, following which the reformation reaction occurs in the reformer.

A controller, or simply "control", 50, is provided for regulating the flow controller 48. The aim of the invention is to provide an appropriate flow of raw fuel feedstock for the reformer 32 to in turn convert to a reformate for providing a sufficient supply of hydrogen-rich fuel to both power the CSA 12 for the particular electrical power demand required by load 18 and also to fuel the reformer burner 36 such that sufficient thermal energy is provided to at least the steam generator 40 to insure appropriate steam enthalpy for the requisite conversion of raw fuel feedstock. In this latter regard, the control 50 monitors the electrical demand, or load current (I), on CSA 12, as measured by a current (I) sensor 52, such as an ammeter, and the enthalpy of the steam supply system 40, as reflected, for instance, by the pressure (P) measured by a pressure sensor P. It will be understood that the steam is saturated and, as such, either the pressure or the temperature of the steam may be used as a measure of the steam enthalpy, with the pressure being preferred because it is more accurately measured at the lower temperatures of a PEM system. The measured current and measured steam pressure are provided as inputs to control 50 via lines 53 and 54, respectively. It will be understood that the term "lines" is used in this context herein to symbolize the respective associated signals, and is not intended to be limited to a hard-wired conductor. A flow control command signal, FC, is provided as an output from control 50 on line 56 connected to the actuator of variable flow controller 48 to effect the requisite fuel flow control action. The status of the resulting fuel flow is monitored by a fuel flow sensor FFL connected to conduit 46, and a corresponding status signal, FFL, is fed back to control 50 via line 58. In conjunction with a further embodiment of the invention described below with reference to FIG. 2, an optional temperature sensor T is connected to monitor the reformer 32 (or 132) top tube temperature and provide that temperature as an optional input to controller 50 via line 60, here shown in broken line form. In each instance, the control assures that the enthalpy of the steam is regulated to meet increases and decreases in power demand while operating within steam pressure limits.

Figure 2:
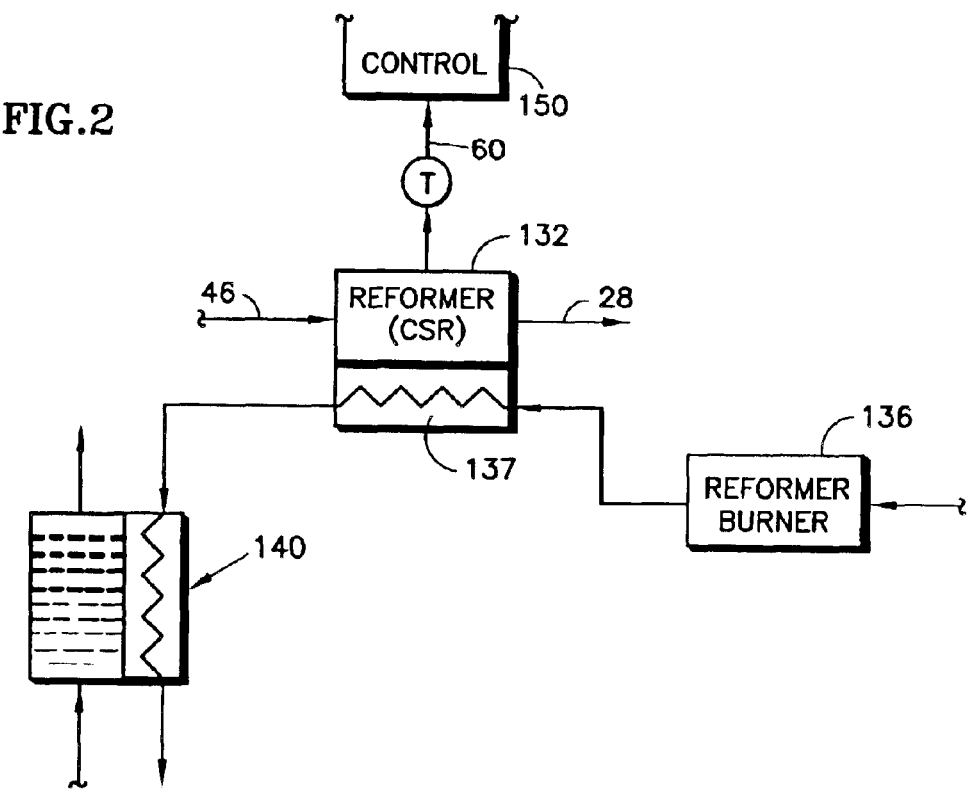
FIG. 2 is an abbreviation of FIG. 1, depicting use of a catalytic steam reformer (CSR) in place of an ATR.

Referring to FIG. 2, an abbreviated portion of the fuel cell power plant is depicted showing an alternate type of reformer, in this instance a catalytic steam reformer (CSR) 132, in place of the ATR 32 of the FIG. 1 embodiment. The CSR 132 operates endothermically, and derives the heat required for the endothermic reaction indirectly from the reformer burner 136 via a heat exchanger 137 in proximity therewith. Further, the exhaust of the reformer burner 136 then flows through the heat exchanger 137 and supplies heat to the primary side of a steam generator 140, which functions to raise steam for use in the reformation reaction in CSR 132 as was done for the ATR 32. The top tube temperature (T) of the CSR 132 is obtained by temperature sensor T and is extended via line 60 as an input to control 150, only partly shown here. The top tube temperature is a good indicator of the operational status of the CSR 132, which information may be more important with respect to CSR 132 than for the ATR 32 because the former operates at a relatively lower temperature.

Figure 3:
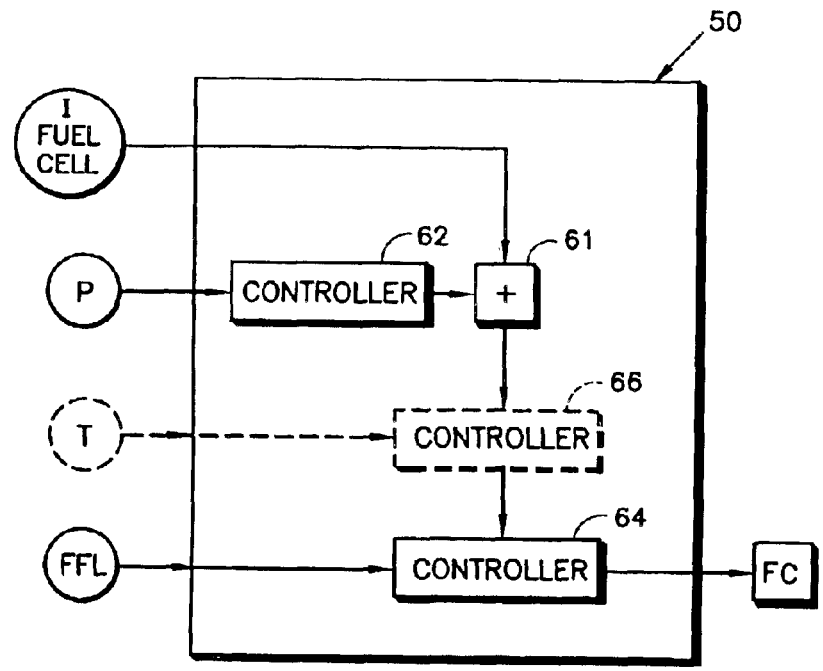
FIG. 3 is a simplified depiction of the basic control arrangement of the invention, and including an optional enhanced embodiment thereof depicted in broken line.

FIG. 3 is a simplified depiction of the basic control arrangement 50 of the invention. Included are the two basic inputs of the fuel cell load demand, represented by current (I), and the steam enthalpy, represented by steam pressure (P). Also included is the fuel flow status feedback signal (FFL). The load current (I) represents the basic demand signal for controlling the fuel flow needs of the system. The pressure signal (P) is processed via a controller 62 to develop an adjustment, or compensation, signal that is used at block 61 to modify the basic demand signal. The FFL feedback signal is processed, via a controller 64, with the modified basic demand signal to derive the flow control command signal FC, which is output from the control 50 and serves to effect the requisite fuel flow control action. The top tube temperature (T) from the CSR 132 is depicted in broken line as an optional further input to the control 50 (or 150) in accordance with a further embodiment of the invention, and similarly is processed via a controller 66, having proportional/integral action, for modification of the basic demand signal. It will be appreciated that the control(s) 50 and/or 150, to be described hereinafter in functionally greater detail, may be implemented in any of a number of different forms, including discrete circuitry, either digital or analog, or via integrated digital circuitry which may contain dedicated logic and associated circuitry and/or be wholly or partly programmable in a known manner consistent with the functional teachings. Typically, the control(s) 50 and/or 150 will, in large part, comprise programmable digital processing means that rely on software for control.

Figure 4:
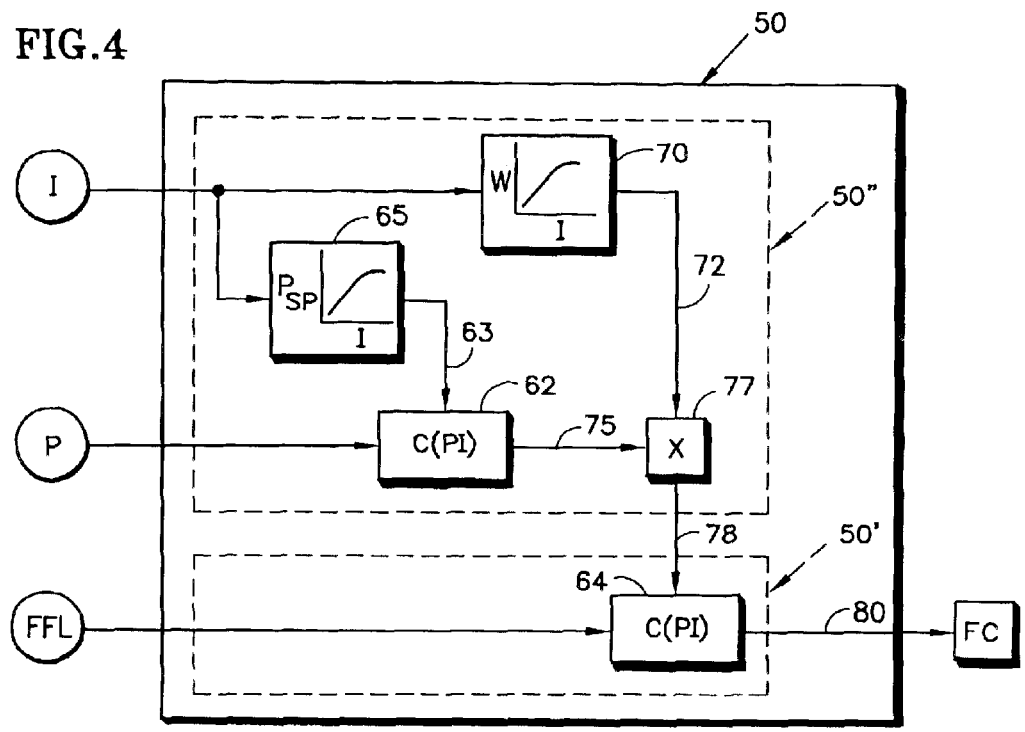
FIG. 4 is a schematic diagram of the control arrangement of the invention, particularly suited for use with a power plant having an ATR fuel processor, as in FIG. 1.
Figure 5:
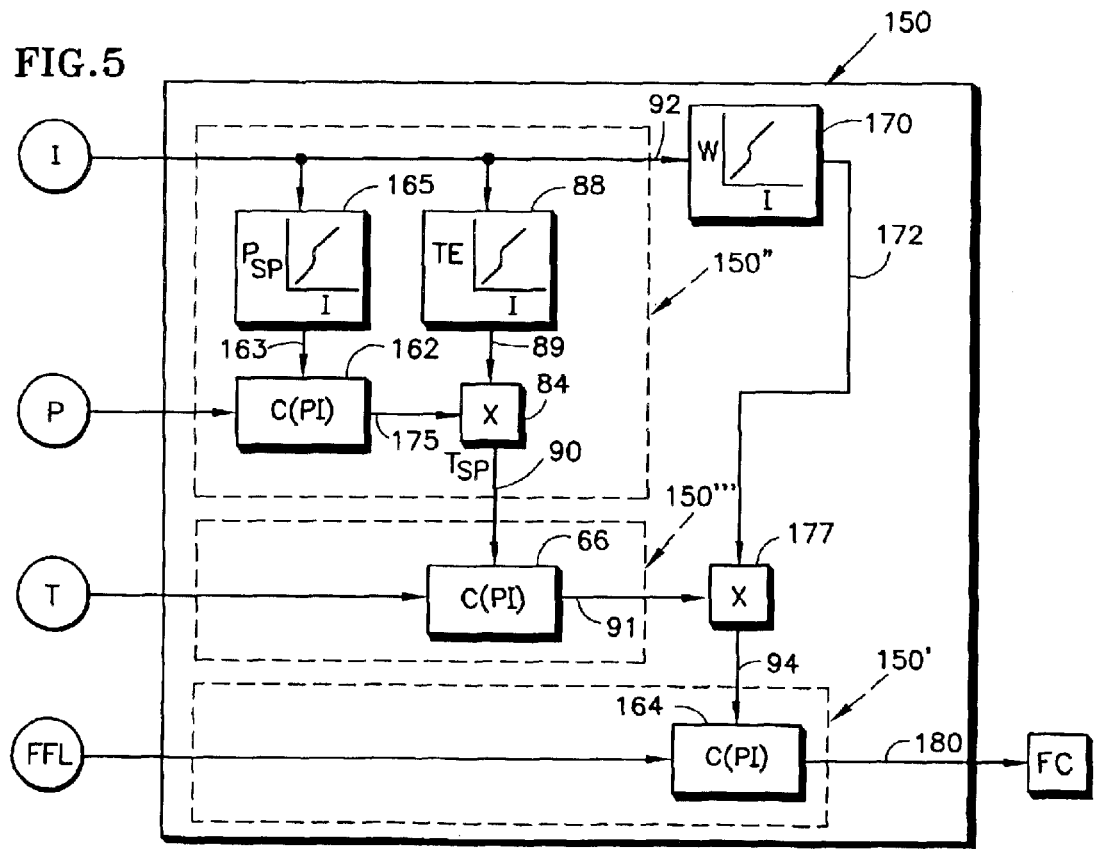
FIG. 5 is a schematic diagram of another embodiment of the control arrangement of the invention, particularly suited for use with a power plant having a CSR fuel processor, as in FIG. 2.

Attention is now given to a more detailed analysis of the control arrangement(s) of the invention, with FIG. 4 representing the more fundamental configuration that may be particularly suited for use with the ATR 32 of FIG. 1 and FIG. 5 representing a refinement that is particularly suited for use with the CSR 132 of FIG. 2. Referring first to FIG. 4, the control 50 is of a cascade configuration having a so-called "inner loop" 50' and an "outer loop" 50". The inner loop 50' uses a controller 64, preferably with proportional/integral (PI) action, and compares measured fuel flow feedback FFL with a set point that is calculated or derived in the outer loop 50", to provide the output command signal FC that sets the position or state of the flow controller 48 to provide the requisite fuel flow. The outer loop 50" includes a controller 62, preferably with PI action, that compares measured steam pressure feedback P against a steam pressure set point $P_{SP}$, which is a function of the fuel cell current I, to derive a flow compensation value. The flow compensation value is applied to the predicted flow set point to provide a compensated flow set point to the inner loop 50'.

More specifically, the fuel cell load current signal, I, is provided as an input that is representative of the present demand on the CSA 12, and serves as the basis for developing the basic fuel flow control set point. That load signal, I, is extended to the input of schedule block, or function, 70. Appropriate lead and/or lag (not shown) may be provided to accommodate up and down transients in operation. The schedule block 70 correlates load current I and desired fuel flow W under normal steady state conditions such that the resulting signal on line 72 is the primary set point for load-following operation.

The measured steam pressure P is compared in controller 62 with a steam pressure set point, $P_{SP}$, provided on line 63, and controller 62 serves to provide, on line 75, a pressure correction or compensation factor. The steam pressure set point, $P_{SP}$, is determined by input of the measured current I to a schedule block 65 that correlates load current with a desired steam pressure, and may be rate limited (not shown). The signals P and $P_{SP}$ are then conditioned in controller 62. This may be done in a variety of ways, including, for example, the determination of an error signal, conditioning of the error signal with a P/I control algorithm, possible summation with a selected feed-forward signal, and/or the application of limits to the resulting signal to establish a "confidence" zone intended to exclude aberrant responses. The resulting compensation signal on line 75 modifies the fuel flow set point signal 72 from schedule 70 via logic 77, which may be multiplication or summing, to then represent the desired fuel flow set point, in fluid volume or weight per unit of time, i.e., "rate", on output lead 78.

Referring to the inner loop 50', the pressure-corrected, or compensated, fuel flow set point signal from logic 77 is extended on line 78 to the controller 64, and provides the set point against which the measured fuel flow signal FFL is compared to ultimately provide the fuel flow command signal FC. This may be done in a variety of ways, including, for example, the determination of an error signal, conditioning of the error signal with a P/I control algorithm, possible summation with a selected feed-forward signal, and/or the application of limits to the resulting signal to establish a "confidence" zone intended to exclude aberrant responses. The resulting signal appears on line 80 as the signal value that is used as the flow control command signal FC. The FC command signal may be provided as an analog value or be converted to commensurate pulses of representative variable widths, depending on the type of controller associated with flow controller 48. In either event, the FC command signal is effective to control the requisite operation of flow controller 48, as by regulating the orifice of a valve or the speed of a blower, etc.

Referring now to FIG. 5, control 150 for the power plant of FIG. 2 having the CSR 132, is depicted in greater detail. The control includes an inner loop 150' that uses a controller 164, preferably with PI action, and compares measured fuel flow feedback FFL with a set point that is calculated or derived in a pair of outer loops 150" and 150'", to provide the output command signal FC that sets the position, or state, of the flow controller 48 to provide the requisite fuel flow. The control 150 is similar in many respects to the control 50 of FIG. 4, with one important difference being that a second outer loop 150'" is provided for factoring the top tube temperature of the CSR 132 into the fuel flow control function.

The first outer loop 150" includes a controller 162, preferably with PI action, that compares measured steam pressure feedback P against a steam pressure set point $P_{SP}$, which is a function of the fuel cell current I, to derive a first compensation value correlated with temperature. This first compensation value is applied to a value determined by correlating temperature with measured fuel cell current I, and the resultant serves as a temperature set point for a controller 66 in the second outer loop 150'". The actual top tube temperature, T, of the CSR 132 is compared at controller 66 with the set point provided by the first outer loop 150" to provide a correction, or compensation, value based on temperature. The product of this compensation value and a predicted flow set point based on the fuel cell current I, provides a compensated flow set point to the inner loop 150'.

More specifically, the fuel cell load current signal, I, is applied as an input to a schedule block, or function, 88. The schedule block 88 correlates load current I with a reformer top tube temperature normally associated therewith under desired conditions. The output of function block 88 is extended, via line 89, to a junction 84 for adjustment, as by multiplication or summation, by the correction signal value that is output from controller 162.

The measured steam pressure P is compared in controller 162 with a steam pressure set point, $P_{SP}$, provided on lead 163. The steam pressure set point, $P_{SP}$, is determined by input of the measured current, I, to a schedule block 165 that correlates load current with a desired steam pressure, and may be rate limited (not shown). The compared signals are then conditioned in controller 162. This may be done in a variety of ways, including, for example, the determination of an error signal, conditioning of the error signal with a P/I control algorithm, possible summation with a selected feed-forward signal, and/or the application of limits to the resulting signal to establish a "confidence" zone intended to exclude aberrant responses. The output 175 of controller 162 is a pressure-based, temperature correction, or compensation, factor extended to junction 84 where it is applied to the primary temperature-correlated signal 89 from function block 88 to provide a first compensated temperature set point signal, $T_{SP}$, on line 90.

The temperature set point, $T_{SP}$, on line 90 is received as an input to controller 66 in the second outer loop 150'" for comparison with the measured top tube temperature, T, of the CSR 132. The compared signals are then conditioned in controller 66, such that the resulting signal on line 91 represents a pressure and temperature-based correction factor. This may be done in a variety of ways, including, for example, the determination of an error signal, conditioning of the error signal with a P/I control algorithm, possible summation with a selected feed-forward signal, and/or the application of limits to the resulting signal to establish a "confidence" zone intended to exclude aberrant responses.

The fuel cell load current signal I is also extended on line 92 to a schedule function 170. The schedule function 170 is analogous to schedule function 70 in FIG. 4, and correlates load current I with a desired fuel flow, in pounds per hour, under normal steady state conditions, such that the resulting signal on line 172 is the primary set point for load-following operation. This signal on line 172 is modified by the pressure and temperature-based correction, or compensation, factor signal on line 91 via logic 177, which may provide multiplication or summing, to then represent, on line 94, the set point for the desired fuel flow.

Referring to the inner loop 150', the pressure-and temperature-compensated fuel flow set point signal from logic 177 is extended on line 94 to the controller 164, and provides the set point against which the measured fuel flow signal FFL is compared. The signals are then conditioned in controller 164, and the resulting signal appears on line 180 as the signal value that is used as the flow control command signal FC. This may be done in a variety of ways, including, for example, the determination of an error signal, conditioning of the error signal with a P/I control algorithm, possible summation with a selected feed-forward signal, and/or the application of limits to the resulting signal to establish a "confidence" zone intended to exclude aberrant responses. As with the FIG. 4 embodiment, the FC command signal may be provided in the appropriate domain or form required to control the flow controller 48.

It will be understood that the various operating parameters of the fuel cell power plant 10, such as the flow of fuel through conduit 46, the temperature of reformate exiting reformer 32, the temperature of partly-depleted hydrogen exiting the anode 22 of CSA 12, the rate at which air is supplied to burner 36, the pressure and temperature of steam in the secondary 40" of steam generator 40, the rate at which steam is provided through conduit 44, etc., are generally within the ranges that are typical and well known for the described configurations.

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. In a fuel cell power plant (10) including a low temperature fuel cell stack assembly (12) for supplying power on demand to an electrical load (18), the cell stack assembly (12) having an anode (22) for receiving and reacting a hydrogen-rich fuel stream (28) and discharging a portion of the hydrogen-rich fuel as an effluent (30), a source (46) of hydrocarbon fuel feedstock, a fuel processing system (14) for converting the hydrocarbon fuel feedstock to the hydrogen-rich fuel stream for the anode, and a supply of steam (40, 44) for the fuel processing system (14) to facilitate the conversion of the hydrocarbon feedstock to provide the hydrogen-rich fuel stream, the steam having an enthalpy provided at least partly by heat from combustion (36) of the hydrogen-rich effluent from the anode, the method for maintaining a balanced supply of steam (40, 44) for the fuel processing system (14), comprising:

sensing at least one parameter (pressure, temperature) to provide a signal (P, T) indicative of the enthalpy of the steam (40, 44) for the fuel processing system (14), at least the pressure of the steam (40, 44) being sensed to provide a signal (P) indicative of the enthalpy of the steam;

sensing at least one parameter (current, voltage) to provide a signal indicative of power demand on the cell stack assembly (12), the load current being sensed to provide a signal (I) indicative of actual power demand; and regulating (48, 50) the flow of hydrocarbon fuel feedstock (46) to the fuel processing system (14) as a function of at least the signals indicative of the enthalpy of the steam and the power demand such that the enthalpy of the steam is regulated to meet increases and decreases in power demand within steam pressure limits, comprising the further steps of:

conditioning (70, 170) the power demand signal (I) to provide a preliminary fuel flow set point signal (72, 172);

modifying (77, 177) the preliminary fuel flow set point signal (72, 172) as a function (62, 162, 66, 88, 84) of at least the signal (P) representing the enthalpy of the steam to provide a compensated fuel flow set point signal (78, 94); and using the compensated fuel flow set point signal (78, 94), providing (FFL, 64, 164) a fuel flow command signal (FC) for controlling (48) the flow of hydrocarbon fuel feedstock (46) to the fuel processing system (14).

2. The method of claim 1 wherein the step of providing a fuel flow command signal (FC) for controlling (48) the flow of hydrocarbon fuel feedstock (46) comprises the further steps of:

measuring the actual fuel flow and providing (58) a feedback signal (FFL) indicative thereof;

comparing (64, 164) the fuel flow feedback signal (FFL) with the compensated fuel flow set point signal (78, 94) to provide an indication of any difference therebetween; and adjusting (64, 164) the compensated fuel flow setpoint signal (78, 94) as a function of the difference indication to provide the fuel flow command signal (FC).

3. The method of claim 2 wherein the fuel processing system (14) includes a catalytic steam reformer (132), and including the further steps of:

sensing a temperature in the catalytic steam reformer to provide a signal (T) indicative of the reaction temperature therein; and further modifying (177) the preliminary fuel flow setpoint signal (172) by a function (66) of the signal (T) indicative of the catalytic steam reformer temperature to provide further compensation (91) to the fuel flow set point signal (94).

4. The method of claim 3, wherein the step of further modifying (177) the preliminary fuel flow set point signal (172) includes the steps of further conditioning (88) the power demand signal (I) to provide a primary temperature-correlated signal (89'), adjusting (84) the primary temperature-correlated signal (89) with a pressure-based compensation signal (175) provided as a function (162) of the signal (P) representing the enthalpy of the steam to thereby provide a compensated temperature set point signal (90), and comparing (162) the signal (T) indicative of catalytic steam reformer temperature with the compensated temperature set point signal (90) to provide the further compensation (91) to the fuel flow set point signal (94).

5. The method of claim 1 wherein the fuel processing system (14) includes a catalytic steam reformer (132), and including the further steps of:

sensing a temperature in the catalytic steam reformer to provide a signal (T) indicative of the reaction temperature therein; and further modifying (177) the preliminary fuel flow setpoint signal (172) by a function (66) of the signal (T) indicative of the catalytic steam reformer temperature to provide further compensation (91) to the fuel flow set point signal (94).

6. The method of claim 5, wherein the step of further modifying (177) the preliminary fuel flow set point signal (172) includes the steps of further conditioning (88) the power demand signal (I) to provide a primary temperature-correlated signal (89'), adjusting (B4) the primary temperature-correlated signal (89) with a pressure-based compensation signal (175) provided as a function (162) of the signal (P) representing the enthalpy of the steam to thereby provide a compensated temperature set point signal (90), and comparing (162) the signal (T) indicative of catalytic steam reformer temperature with the compensated temperature set point signal (90) to provide the further compensation (91) to the fuel flow set point signal (94).

7. In a fuel cell power plant (10) including a low temperature fuel cell stack assembly (12) for supplying power on demand to an electrical load (18), the cell stack assembly (12) having an anode (22) for receiving and reacting a hydrogen-rich fuel stream (28) and discharging a portion of the hydrogen-rich fuel as an effluent (30), a source (46) of hydrocarbon fuel feedstock, a fuel processing system (14) for converting the hydrocarbon fuel feedstock to the hydrogen-rich fuel stream for the anode, and a supply of steam (40, 44) for the fuel processing system (14) to facilitate the conversion of the hydrocarbon feedstock to provide the hydrogen-rich fuel stream, the steam having an enthalpy provided at least partly by heat from combustion (36) of the hydrogen-rich effluent from the anode, a control arrangement (48, 50, 150, I, T, P, FFL) for maintaining a balanced supply of steam (40, 44) for the fuel processing system (14) comprising:

means (P, T) for sensing at least one parameter (pressure, temperature) indicative of the enthalpy of the steam (40, 44) for the fuel processing system (14) and providing a commensurate signal (P, T), the means (P, T) for sensing at least one parameter (pressure, temperature) indicative of the enthalpy of the steam (40, 44) for the fuel processing system (14) senses at least the pressure of steam and provides a commensurate signal (P);

means (I) for sensing at least one parameter (current, voltage) indicative of power demand on the cell stack assembly (12) and providing a commensurate signal (I), the means (I) for sensing at least one parameter (current, voltage) indicative of power demand on the cell stack assembly (12) senses load current and provides a commensurate signal (I);

means (48) for regulating flow of the hydrocarbon feedstock in response to a fuel command signal (FC); and control means (50, 150) responsive to the signal (P, T) indicative of the enthalpy of the steam and to the signal (I) indicative of the power demand on cell stack assembly (12), for providing the fuel command signal (FC) such that the enthalpy of the steam is regulated to meet increases and decreases in power demand within steam pressure limits, the control means (50, 150) comprises conditioning means (70, 170) responsive to the power demand signal (I) for providing a preliminary fuel flow set point signal (72, 172), and compensating means (62, 162, 66, 88, 84, 77, 177) responsive to at least the steam pressure (P) for compensating the preliminary fuel flow set point signal (72, 172) as a function of at least the enthalpy of the steam to provide a compensated fuel flow set point signal (78, 94).

8. The control arrangement (48, 50, 150, I, T, P. FFL) of claim 7 including fuel flow measuring means (FFL, 158) for providing a feedback signal (FEL) indicative of the actual fuel flow, and wherein the control means (50, 150) further include means (64, 164) responsive to the compensated fuel flow set point signal (78, 94) and the feedback signal (FFL) of actual fuel flow for providing the fuel flow command signal (FC).

9. The control arrangement (48, 50, 150, I, T, P, FFL) of claim 8 wherein the fuel processing system (14) of the fuel cell power plant (10) includes a catalytic steam reformer (132), the means (P, T) for sensing at least one parameter (pressure, temperature) indicative of the enthalpy of the steam (40, 44) for the fuel processing system (14) additionally senses the reaction temperature (T) in the catalytic steam reformer (132) and provides a commensurate signal (T), and the compensating means (62, 162, 66, 88, 84, 77, 177) is further responsive to the temperature (T) in the catalytic steam reformer (132) for further compensating (66, 177) the preliminary fuel flow set point signal (72, 172) as a function of the catalytic steam reformer reaction temperature (T) to provide a further compensated fuel flow set point signal (94).

10. In a fuel cell power plant (10) including a low temperature fuel cell stack assembly (12) normally operating at temperatures below about 180° F. for supplying power on demand to an electrical load (18), the cell stack assembly (12) having an anode (22) for receiving and reacting a hydrogen-rich fuel stream (28) and discharging a portion of the hydrogen-rich fuel as an effluent (30), a source (46) of hydrocarbon fuel feedstock, a fuel processing system (14) for converting the hydrocarbon fuel feedstock to the hydrogen-rich fuel stream for the anode, and a supply of steam (40, 44) for the fuel processing system (14) to facilitate the conversion of the hydrocarbon feedstock to provide the hydrogen-rich fuel stream, the steam having an enthalpy provided at least partly by heat from combustion (36) of the hydrogen-rich effluent from the anode, the method for maintaining a balanced supply of steam (40, 44) for the fuel processing system (14), comprising:

sensing at least one parameter (pressure, temperature) to provide a signal (P, T) indicative of the enthalpy of the steam (40, 44) for the fuel processing system (14), at least the pressure of the steam (40, 44) being sensed to provide said signal (P) indicative of the enthalpy of the steam;

sensing at least one parameter (current, voltage) to provide a signal indicative of power demand on the cell stack assembly (12); and regulating (48, 50) the flow of hydrocarbon fuel feedstock (46) to the fuel processing system (14) as a function of at least the signals indicative of the enthalpy of the steam and the power demand such that the enthalpy of the steam is regulated to meet increases and decreases in power demand within steam pressure limits.

11. In a fuel cell power plant (10) including a low temperature fuel cell stack assembly (12) normally operating at temperatures below about 180° F. for supplying power on demand to an electrical load (18), the cell stack assembly (12) having an anode (22) for receiving and reacting a hydrogen-rich fuel stream (28) and discharging a portion of the hydrogen-rich fuel as an effluent (30), a source (46) of hydrocarbon fuel feedstock, a fuel processing system (14) for converting the hydrocarbon fuel feedstock to the hydrogen-rich fuel stream for the anode, and a supply of steam (40, 44) for the fuel processing system (14) to facilitate the conversion of the hydrocarbon feedstock to provide the hydrogen-rich fuel stream, the steam having an enthalpy provided at least partly by heat from combustion (36) of the hydrogen-rich effluent from the anode, a control arrangement (48, 50, 150, I, T, P, FFL) for maintaining a balanced supply of steam (40, 44) for the fuel processing system (14) comprising:

means (P, T) for sensing at least one parameter (pressure, temperature) indicative of the enthalpy of the steam (40, 44) for the fuel processing system (14) and providing a commensurate signal (P, T), at least the pressure of the steam (40, 44) being sensed to provide said signal (P) indicative of the enthalpy of the steam;

means (I) for sensing at least one parameter (current, voltage) indicative of power demand on the cell stack assembly (12) and providing a commensurate signal (I);

means (48) for regulating flow of the hydrocarbon feedstock in response to a fuel command signal (FC); and control means (50, 150) responsive to the signal (P, T) indicative of the enthalpy of the steam and to the signal (I) indicative of the power demand on cell stack assembly (12), for providing the fuel command signal (FC) such that the enthalpy of the steam is regulated to meet increases and decreases in power demand within steam pressure limits.

\* \* \* \* \*